United States Patent
You et al.

(10) Patent No.: US 7,068,814 B2
(45) Date of Patent: Jun. 27, 2006

(54) VISUAL TRACKING METHOD BY COLOR INFORMATION

(75) Inventors: Bum Jae You, Seoul (KR); Sang Rok Oh, Seoul (KR); Yong Beom Lee, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 1005 days.

(21) Appl. No.: 09/903,515

(22) Filed: Jul. 13, 2001

(65) Prior Publication Data

US 2002/0076087 A1  Jun. 20, 2002

(30) Foreign Application Priority Data

Oct. 27, 2000  (KR) ............................... 2000-63401

(51) Int. Cl.
*G06K 9/00* (2006.01)
(52) U.S. Cl. ...................................... 382/103; 348/169
(58) Field of Classification Search ................ 382/103; 348/169–172
See application file for complete search history.

(56) References Cited

U.S. PATENT DOCUMENTS 5,559,551 A * 9/1996 Sakamoto et al. .......... 348/169

6,731,792 B1 * 5/2004 Tanaka ......................... 382/164
6,760,465 B1 * 7/2004 McVeigh et al. ............ 382/103

OTHER PUBLICATIONS

Yong Beom Lee, Bum Jae You, Seong-Whan Lee, Kwang-Bae Kim, *Real-Time Face Tracking Algorithm Robust To Illumination Variations, Proceedings Of The KIEE Summer Annual Conference 2000*, Jul. 17, 2000; pp. 3037-3040 with cover sheet.

* cited by examiner

*Primary Examiner*—Brian Werner
*Assistant Examiner*—Christopher Lavin
(74) *Attorney, Agent, or Firm*—Bacon & Thomas, PLLC

(57) ABSTRACT

A method of visual tracking with use of color includes the step of three-dimensional color modeling of the target, the step of target recognition for initially perceiving the target, and the step of visual tracking for repetitive visual tracking. In order to be robust to irregular or abrupt changes of illumination, the present invention provides a visual tracking method in which characteristics of the photographing element (CCD or CMOS) used by the camera are analyzed beforehand and the results of the analysis are modeled by a B-spline curve, allowing effects of the real-time visual tracking and adaptability to situations of rapid target movement.

3 Claims, 3 Drawing Sheets

$H_m(i)$ (AVERAGE HUE)

$S_m(i)$ (AVERAGE SATURATION)

$S_\sigma(i)$ (STANDARD DEVIATION OF SATURATION)

VISUAL TRACKING METHOD BY COLOR INFORMATION

BACKGROUND OF THE INVENTION

1. Field of the Invention

The present invention relates to a method of visual tracking with use of color. More particularly, the invention relates to a visual target tracking method applicable for various fields in such techniques as correcting important parts of recorded images for broadcasting stations, tracking human faces in unmanned monitoring systems, tracking speakers for remote conferences, or remote conversation through communication networks, setting face contours for face recognition in security systems, tracking of a specified target, and so forth.

The need for tracking or recognizing a target having a specific color is increased in various application fields like broadcasting, unmanned monitoring systems, security systems, remote conferencing through communication networks, control of unmanned flying objects, unmanned docking systems, etc. Considering the fact that a majority of information human beings obtain is through visual means, visual tracking techniques are expected to further expand their application fields in the future.

2. Description of the Related Art

In conventional visual tracking techniques using color information, colors of the target have been represented by color models known to be robust with respect to illumination changes, such as in normalized Red-Green-Blue (R-G-B) space or Hue-Saturation-Intensity (H-S-I) space.

However, these color models well accommodate uniform changes of illumination, but show limitations in cases where the brightness of the target changes irregularly due to angle changes between light source and target or the brightness changes abruptly.

For example, when a man is walking through a gallery whose ceiling is equipped with fluorescent lights at uniform intervals, the relative position of the immediately affecting fluorescent light relative to the man keeps changing and, therefore, the brightness of the man's face keeps changing. And depending on the direction the man is moving, it often probable that one side of the face gets darker while the other side gets lighter. Moreover, the surface reflectiveness of a human face is hardly uniform due to secretion of sweat and it is extremely unlikely for the whole face to have uniform illumination changes.

In other words, since color distribution changes as illumination intensity varies, the conventional visual tracking techniques have problems in using a color model normalized and set-up for uniform illumination changes.

SUMMARY OF THE INVENTION

It is an object of the present invention to resolve the aforementioned problems by providing a method of visual tracking with use of color information which is robust to irregular or abrupt changes of illumination.

It is another object of the present invention to provide a visual tracking method using color information in which a characteristic of the photographing element of the camera is analyzed and the results of the analysis is modeled by a B-spline curve, allowing real-time visual tracking and application to situations of rapid movement of the target.

The present invention proposes a visual tracking method in which the photographing element of a camera (CCD or CMOS) is analyzed for brightness characteristics and the analysis results are modeled beforehand so that it resolves the problems of the conventional visual tracking algorithm, which is not adaptable to non-uniform or irregular changes of illumination.

The present invention also proposes a motion acceleration predictor for improving the speed of visual tracking.

The present invention provides a visual tracking method using color information comprising: a three-dimensional color modeling step in which images obtained under various illumination conditions are analyzed and thereby the photographing characteristics of the camera as to the target is represented by a three-dimensional model; a target recognition step in which judgement is made by the difference between the previous and the current images about whether or not a new target object appears, the target region is located by applying the color model in said three-dimensional color modeling step, and the final decision is made as to whether or not visual tracking is to be performed for the target depending on the shape analysis of the target region, and a third step of visual tracking in which an arbitrary pixel is monitored and judged using said color model if it belongs to the target region, the judgement process being adaptable at the same time to the movement speed of the target by estimating the movement of the target region.

The above and other features and advantages of the present invention will be more clearly understood for those skilled in the art from the following detailed description taken in conjunction with the accompanying drawings, which form a part of this disclosure.

DETAILED DESCRIPTION OF THE EMBODIMENT

Hereinafter, the present invention is described in detail by referring to the accompanying drawings.

Figure 1:
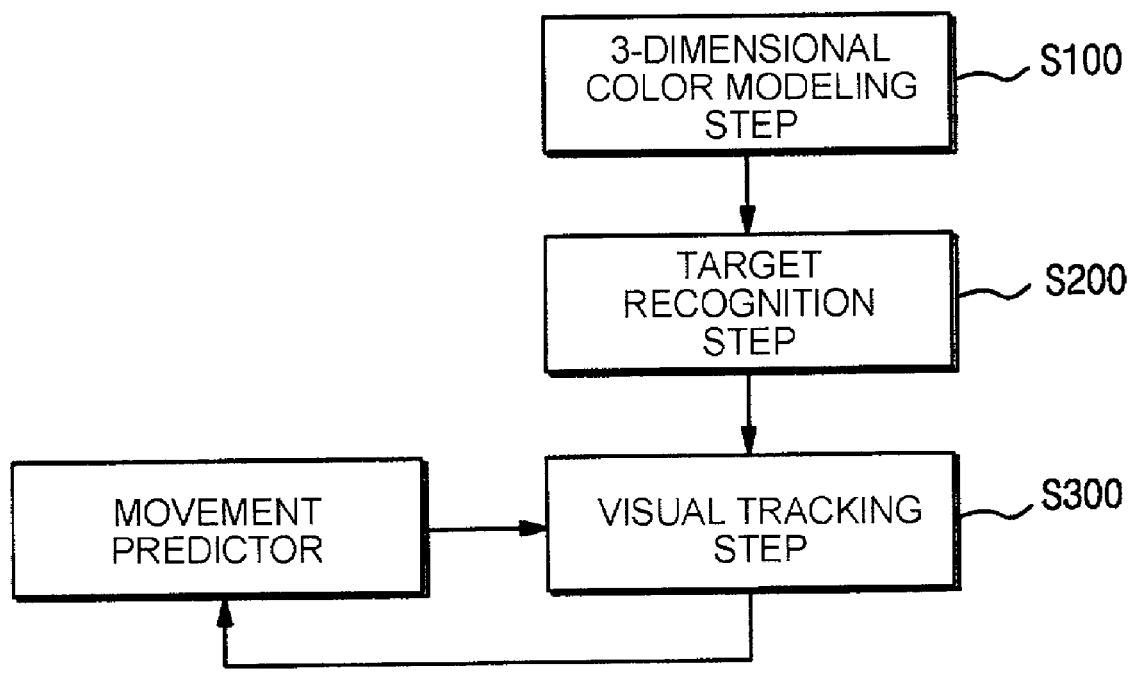
FIG. 1 is a schematic block diagram representing the concept of the visual tracking method according to the present invention.
Figure 2:
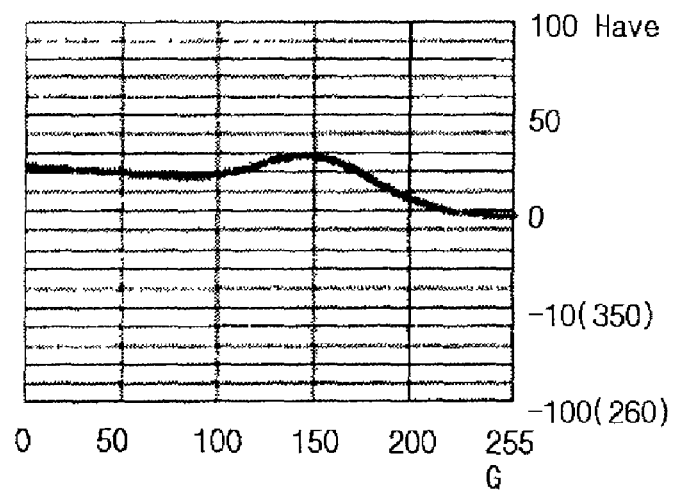
FIG. 2 is a graph showing the average hue to the brightness value modeled by the present invention.
Figure 3:
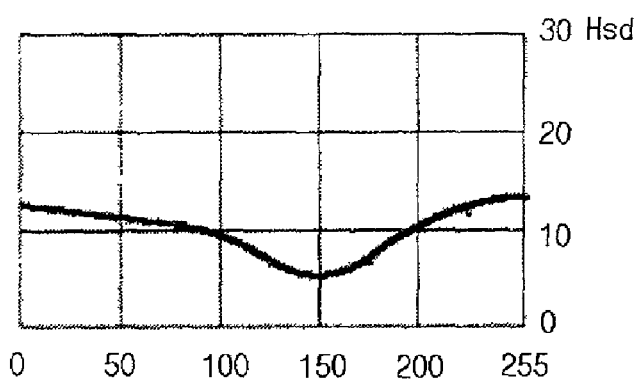
FIG. 3 is a graph showing the standard deviation of hue to the brightness value modeled by the present invention.
Figure 4:
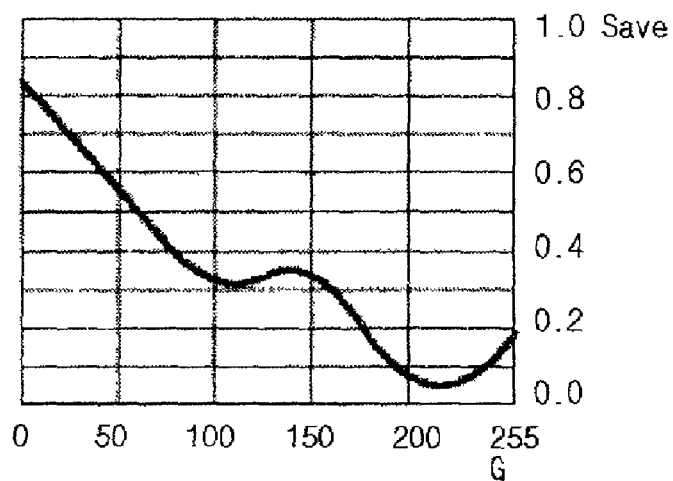
FIG. 4 is a graph showing the average saturation to the brightness value modeled by the present invention.
Figure 5:
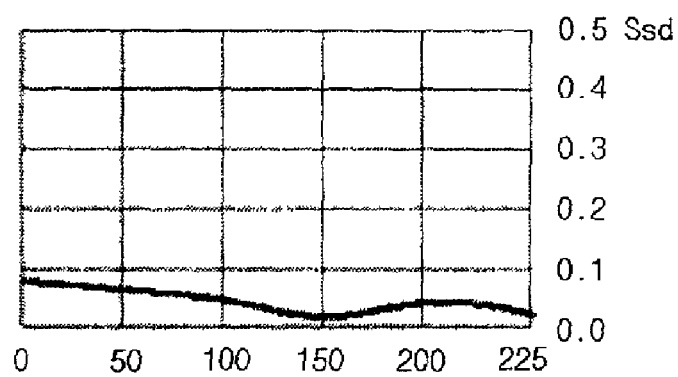
FIG. 5 is a graph showing the standard deviation of saturation to the brightness value modeled by the present invention.

First of all, the visual tracking method according to the present invention comprises the step of three-dimensional color modeling of the target (S100), the step of target recognition for initially perceiving the target (S200), and the step of visual tracking for repetitive visual tracking (S300). The basic concept of the invention is schematically shown in FIG. 1.

The first step of three-dimensional color modeling (S100) is the step of establishing a three-dimensional color model, which has to be performed before initiation of the visual tracking.

The above color model consists of four quadratic functions representing average and standard deviation of target hue with respect to brightness changes and average and standard deviation of target saturation. These four quadratic functions constitute a single Gaussian function.

For this purpose, the model is obtained by dividing the whole region subject to brightness changes of the image into n regions with regular sizes and by approximating two adjacent regions using quadratic curves, accomplishing the model for the whole region.

Here, each region is represented by a quadratic function such as Eqn. 1 along with boundary conditions of the quadratic curves represented by Eqns. 2–4. In other words, the model is built by the region curve (Eqn. 1) along with boundary value condition (Eqn. 2), continuity condition at the boundary (Eqn. 3), and second derivative condition for the region curve (Eqn. 4) as shown in the following:

$$f_i(x) = a_i \cdot x^2 + b_i \cdot x + c_i. \quad [\text{Eqn. 1}]$$

$$f_i(x_i) = a_i \cdot x_i^2 + b_i \cdot x_i + c_i = f(x_i), \text{ for } i=1, 2, \ldots n-1.$$

$$f_i(x_{i+1}) = a_i \cdot x_{i+1}^2 + b_i \cdot x_{i+1} + c_i = f(x_{i+1}), \text{ for } i=1, 2, \ldots n-1. \quad [\text{Eqn. 2}]$$

$$2 \cdot a_i \cdot x_{i+1} + b_i = 2 \cdot a_{i+1} \cdot x_{i+1} + b_{i+1}, \text{ for } i=1, 2, \ldots n-1. \quad [\text{Eqn. 3}]$$

$$a_1 = 0. \quad [\text{Eqn. 4}]$$

Herein, x is the brightness of the concerning pixel, and f(x) is the average or standard deviation of the hue or the average or standard deviation of the saturation for the given brightness x.

If the whole range of brightness is divided into 5, the relational equation for obtaining the coefficients of the quadratic curve for each region can be represented by a single matrix equation of Eqn.-5 as shown in the following:

$$(b_1 c_1 a_2 b_2 c_2 a_3 b_3 c_3 a_4 b_4 c_4)^T = \quad [\text{Eqn. 5}]$$

$$\begin{bmatrix} x_1 & 1 & 0 & 0 & 0 & 0 & 0 & 0 & 0 & 0 & 0 \\ 0 & 0 & x_2^2 & x_2 & 1 & 0 & 0 & 0 & 0 & 0 & 0 \\ 0 & 0 & 0 & 0 & 0 & x_3^2 & x_3 & 1 & 0 & 0 & 0 \\ 0 & 0 & 0 & 0 & 0 & 0 & 0 & 0 & x_4^2 & x_4 & 1 \\ x_2 & 1 & 0 & 0 & 0 & 0 & 0 & 0 & 0 & 0 & 0 \\ 0 & 0 & x_3^2 & x_3 & 1 & 0 & 0 & 0 & 0 & 0 & 0 \\ 0 & 0 & 0 & 0 & 0 & x_4^2 & x_4 & 1 & 0 & 0 & 0 \\ 0 & 0 & 0 & 0 & 0 & 0 & 0 & 0 & x_5^2 & x_5 & 1 \\ 1 & 0 & -2x_2 & -1 & 0 & 0 & 0 & 0 & 0 & 0 & 0 \\ 0 & 0 & 2x_3 & 1 & 0 & -2x_3 & -1 & 0 & 0 & 0 & 0 \\ 0 & 0 & 0 & 0 & 0 & 2x_4 & 1 & 0 & -2x_4 & -1 & 0 \end{bmatrix}^{-1} \begin{bmatrix} f(x_1) \\ f(x_2) \\ f(x_3) \\ f(x_4) \\ f(x_2) \\ f(x_3) \\ f(x_4) \\ f(x_5) \\ 0 \\ 0 \\ 0 \end{bmatrix}$$

Herein, $(a_i, b_i, c_i)$ for i=1, 2, 3, and 4 denote coefficients for a quadratic curve representing each region.

Based on four relational equations obtained above, the three-dimensional color model is represented by the following Eqns. 6 and 7; i.e., $$H_m(i) - T_h \cdot H_\sigma(i) \leq H_{3D}(i) \leq H_m(i) + T_h \cdot H_\sigma(i) \quad [\text{Eqn. 6}]$$

$$S_m(i) - T_h \cdot S_\sigma(i) \leq S_{3D}(i) \leq S_m(i) + T_h \cdot S_\sigma(i) \quad [\text{Eqn. 7}]$$

Herein, $H_m(i)$ for $0 \leq i \leq 255$ is the function of hue average, $H_\sigma(i)$ for $0 \leq i \leq 255$ is the function of hue standard deviation, $S_m(i)$ for $0 \leq i \leq 255$ is the function of saturation average, $S_\sigma(i)$ for $0 \leq i \leq 255$ is the function of saturation standard deviation, and $H_{3D}(i)$ for $0 \leq i \leq 255$ and $S_{3D}(i)$ for $0 \leq i \leq 255$ are the color model functions.

In the second step of target recognition (S200), judgement is made about whether a new target object appears by the difference between the previous and the current images, the target region is located by applying the color model newly proposed in the previous step, and the final decision is made as to whether or not visual tracking is to be performed for the target by shape analysis of the target region.

The aforementioned shape analysis is performed by comparing the actual shape of the image in the target region against the outlined shape inputted beforehand. For example, if a human face is tracked, an egg shape is chosen as the reference for contour comparison; if a ball is tracked, a circular shape is chosen as a comparison reference.

In the third step of visual tracking (S300), the recognized target region is continuously tracked.

In this step, an arbitrary pixel is monitored and judged continuously if it belongs to the target region using the formulated color model, while the target region movement is estimated and the judgement process has to accommodate the movement speed of the target.

A Kalman filter technique might be considered for the movement prediction. However, it has a slow algorithmic speed due to its heavy arithmetic load, and an exhibits the drawback that prompt adaptation is impossible for abrupt movement because it utilizes too much past information.

To cope with this difficulty, the present invention employs a simple movement tracking method, which uses analysis results of the past three images as shown in Eqn. 8; i.e., $$P_m(i) = \frac{d\left(\frac{F_m(i-1)}{dt}\right)}{dt} \approx \frac{F_m(i-1) - 2 \cdot F_m(i-2) + F_m(i-3)}{\Delta t \cdot \Delta t} \quad [\text{Eqn. 8}]$$

Herein, $P_m(i)$ is the predicted acceleration of the target region in the i-th image, $F_m(i)$ is the position of the target region in the i-th image, and $\Delta t$ is the time increment between the i-th and (i−1)-th images.

FIGS. 2 through 5 show four curves which are modeled for face tracking according to the present invention under various illumination conditions.

In FIGS. 2 through 5, the abscissa represents brightness value while the ordinate represents average and standard deviation of hue and those of saturation, respectively.

According to the present invention, the brightness of the face changes depending on the relative position of the ceiling fluorescent lamp to the face, and the tracking works continuously even if illumination is abruptly darkened.

As shown previously, the present invention allows adaptable performance of a camera when a target with a specific color is tracked under irregular or non-uniform change of illumination. In other words, the camera photographing characteristics as to the target are three-dimensionally modeled by analyzing the images obtained under various brightness conditions, thus enhancing reliability against illumination changes, and a simple acceleration predictor with a light arithmetic burden is employed for adaptation to movement speed change of the target. As a result, the present invention has an effect which can be utilized in various application fields like broadcasting, unmanned monitoring systems, security systems, remote conferencing through communication networks, control of unmanned flying objects, unmanned docking systems, and so forth. Although the present invention has been described and illustrated in connection with the specific embodiments, it will be apparent for those skilled in the art that various modifications and changes may be made without departing from the idea and scope of the present invention set forth in the appended claims.

The invention claimed is:

1. A visual tracking method using color information comprising:

a three-dimensional color modeling step (S100) in which the color model is constituted by four quadratic functions representing average and standard deviation of target hue and average and standard deviation of target saturation, wherein said color model for the whole region is accomplished by dividing the whole region subject to image brightness changes into n regions with regular sizes and by approximating each region using a quadratic curve and making the four quadratic functions constitute a single Gaussian function;

a target recognition step (S200) in which judgement is made based on the difference between the previous and the current images about whether or not a new target object appears, a target region is located by applying the color model in said three-dimensional color modeling step (S100), and the final decision is made as to whether or not visual tracking is to be performed for the target depending on the shape analysis of the target region; and a step of visual tracking (S300) in which an arbitrary pixel is monitored and judged using said color model if it belongs to the target region and at the same time the judgement process is adapted to the movement speed of the target by estimating the movement of the target region.

2. A visual tracking method using color information of claim 1 wherein said three-dimensional color model is said three-dimensional color modeling step (S100) is formulated according to the following equations:

$$H_m(i) - T_h \cdot H_\sigma(i) \leq H_{3D}(i) \leq H_m(i) + T_h \cdot H_\sigma(i)$$

$$S_m(i) - T_h \cdot S_\sigma(i) \leq S_{3D}(i) \leq S_m(i) + T_h \cdot S_\sigma(i)$$

where $H_m(i)$ for $0 \leq i \leq 255$ is the function of hue average, $H_\sigma(i)$ for $0 \leq i \leq 255$ is the function of hue standard deviation, $S_m(i)$ for $0 \leq i \leq 255$ is the function of saturation average, $S_\sigma(i)$ for $0 \leq i \leq 255$ is the function of saturation standard deviation, and $H_{3D}(i)$ for $0 \leq i \leq 255$ and $S_{3D}(i)$ for $0 \leq i \leq 255$ are the color model functions.

3. A visual tracking method using color information of claim 1 wherein the predicted acceleration in said visual tracking step (S300) is given by the equation of $$P_m(i) = \frac{d\left(\frac{F_m(i-1)}{dt}\right)}{dt} \approx \frac{F_m(i-1) - 2 \cdot F_m(i-2) + F_m(i-3)}{\Delta t \cdot \Delta t}$$

where $P_m(i)$ is the predicted acceleration of the target region in the i-th image, $F_m(i)$ is the position of the target region in the i-th image, the $\Delta t$ is the time increment between the i-th and (i−1)-th images.

* * * * *